(12) United States Patent
Hoover et al.

(10) Patent No.: US 11,867,891 B2
(45) Date of Patent: Jan. 9, 2024

(54) POLARIMETER WITH MULTIPLE INDEPENDENT TUNABLE CHANNELS AND METHOD FOR MATERIAL ORIENTATION IMAGING

(71) Applicant: ADVANCED OPTICAL TECHNOLOGIES, INC., Albuquerque, NM (US)

(72) Inventors: Brian G. Hoover, Tijeras, NM (US); Jonathan H. Turner, Albuquerque, NM (US)

(73) Assignee: Advanced Optical Technologies, Inc., Albuquerque, NM (US)

( * ) Notice: Subject to any disclaimer, the term of this patent is extended or adjusted under 35 U.S.C. 154(b) by 112 days.

(21) Appl. No.: 16/748,463

(22) Filed: Jan. 21, 2020

(65) Prior Publication Data
US 2020/0271911 A1   Aug. 27, 2020

Related U.S. Application Data

(63) Continuation-in-part of application No. 15/542,064, filed as application No. PCT/US2016/068411 on Dec. 22, 2016, now Pat. No. 10,540,571.

(51) Int. Cl.
*G02B 21/00* (2006.01)
*G01J 4/04* (2006.01)
(Continued)

(52) U.S. Cl.
CPC ............ *G02B 21/0092* (2013.01); *G01J 4/04* (2013.01); *G01N 21/21* (2013.01); *G01N 2021/8477* (2013.01); *G02B 21/0068* (2013.01)

(58) Field of Classification Search
None
See application file for complete search history.

(56) References Cited

U.S. PATENT DOCUMENTS 3,125,471 A * 3/1964 Conner, Jr. ............. F24S 70/10
                                                          428/336
4,306,809 A    12/1981 Azzam
(Continued)

FOREIGN PATENT DOCUMENTS

JP    2002-151774    5/2002
JP    2005-181927    7/2005
(Continued)

OTHER PUBLICATIONS

Tyo, J. Scott, et al. "Design and optimization of partial Mueller matrix polarimeters." Applied optics 49.12 (2010): 2326-2333. (Year: 2010).*

(Continued)

*Primary Examiner* — Rufus L Phillips
(74) *Attorney, Agent, or Firm* — Peacock Law P.C.; Janeen Vilven

(57) ABSTRACT

A polarimeter and a method of analyzing and imaging microstructural material orientation of a sample are disclosed. The polarimeter, which is a partial Mueller-matrix polarimeter (pMMP), accesses multiple independent polarization channels by employing two independent polarization modulators configured to switch serially among multiple independent settings, wherein the combination of the settings of the first and second polarization modulators defines an independent polarization channel, and wherein an imaging detector produces a set of spatially registered images that are synchronized with the channels formed by the polarization modulators; and wherein a processor connected with a memory executes a classification algorithm stored in the memory that maps the set of images to one or more material orientation images by mapping the set of values for each detector pixel corresponding to the set of spatially registered images to a value of material orientation at each pixel coordinate using a machine-learning model, an electrody- (Continued)

namic model, or a combination thereof. The invention can thereby create material microstructural orientation images of diverse anisotropic materials, for instance polymer domains, fiber bundles or plys, and metallic crystalline grains.

16 Claims, 4 Drawing Sheets

(51) Int. Cl.
    *G01N 21/21*     (2006.01)
    *G01N 21/84*     (2006.01)

(56) References Cited

U.S. PATENT DOCUMENTS

| | | | |
|---|---|---|---|
| 4,688,939 A | 8/1987 | Ray | |
| 4,881,818 A | 11/1989 | Bustamante et al. | |
| 5,096,862 A * | 3/1992 | Mathers | C04B 35/115 |
| | | | 501/96.1 |
| 5,247,176 A | 9/1993 | Goldstein | |
| 5,711,474 A * | 1/1998 | Hummel | B23K 9/0286 |
| | | | 228/212 |
| 5,929,443 A | 7/1999 | Alfano et al. | |
| 5,956,147 A | 9/1999 | Jellison, Jr. et al. | |
| 6,060,710 A | 5/2000 | Carrieri et al. | |
| 6,317,170 B1 | 11/2001 | Hwang et al. | |
| 6,351,324 B1 | 2/2002 | Lint | |
| 6,389,408 B1 * | 5/2002 | Carrieri | G01N 21/21 |
| | | | 382/156 |
| 7,218,398 B2 * | 5/2007 | Smith | G01N 21/21 |
| | | | 356/367 |
| 7,289,211 B1 | 10/2007 | Walsh, Jr. et al. | |
| 7,333,897 B2 | 2/2008 | Stratis et al. | |
| 8,116,000 B2 | 2/2012 | Plant | |
| 2001/0030290 A1 | 10/2001 | Stern | |
| 2002/0027932 A1 | 3/2002 | Takada | |
| 2002/0051564 A1 * | 5/2002 | Benesch | G03F 7/70491 |
| | | | 382/145 |
| 2003/0210444 A1 | 11/2003 | Lee | |
| 2004/0012853 A1 | 1/2004 | Garcia et al. | |
| 2005/0264813 A1 | 12/2005 | Giakos | |
| 2007/0146632 A1 | 6/2007 | Chipman | |
| 2008/0212102 A1 * | 9/2008 | Nuzzo | G01N 21/554 |
| | | | 356/445 |
| 2009/0116518 A1 | 5/2009 | Patel et al. | |
| 2009/0262350 A1 * | 10/2009 | Abbott | G01N 21/21 |
| | | | 356/365 |
| 2010/0280765 A1 * | 11/2010 | Marquardt | G01S 17/95 |
| | | | 702/24 |
| 2011/0194175 A1 | 8/2011 | Dougherty et al. | |
| 2011/0309240 A1 * | 12/2011 | Yu | H01L 27/1443 |
| | | | 250/214.1 |
| 2012/0268812 A1 | 10/2012 | Anhut et al. | |
| 2014/0009610 A1 | 1/2014 | Scherbarth et al. | |
| 2014/0078298 A1 | 3/2014 | Kudenov et al. | |
| 2015/0253559 A1 | 9/2015 | Kalkbrenner et al. | |
| 2015/0276864 A1 | 10/2015 | Yurt et al. | |
| 2016/0209270 A1 | 7/2016 | Seyfried et al. | |
| 2017/0138851 A1 * | 5/2017 | Ashrafi | G01N 21/21 |
| 2017/0225257 A1 * | 8/2017 | Lapelosa | A46B 7/044 |
| 2019/0073561 A2 | 3/2019 | Hoover et al. | |

FOREIGN PATENT DOCUMENTS

| | | |
|---|---|---|
| JP | 2012-078802 | 4/2012 |
| JP | 2015-527618 | 9/2015 |
| WO | 99/38046 | 7/1999 |
| WO | 2009/070160 | 6/2009 |

OTHER PUBLICATIONS

Oriol Arteaga and Bart Kahr, "Mueller matrix polarimetry of bianisotropic materials [Invited]," J. Opt. Soc. Am. B 36, F72-F83 (2019) (Year: 2019).*

Hoover, Brian G., et al., "Polarization components analysis for invariant discrimination", Applied Optics, vol. 46, No. 34, 2007, 8364-8373.

Jahr, Wiebke, et al., "Hyperspectral light sheet microscopy", Nature Communications vol. 6, No. 7990, 2015, 1-7.

Jones, Douglas G., et al., "Reflective and polarimetric characteristics of urban materials", Proc. of SPIE vol. 6240, 62400A, 2006, 1-10.

Vannier, Nicolas, et al., "Comparison of different active polarimetric imaging modes for target detection in outdoor environment", Applied Optics, vol. 55, No. 11, 2016, 2881-2891.

Zhang, Shu, "Viscoelasticity Measurements Inside Liposomes", Proc. of SPIE vol. 9164, 2014, 1-7.

* cited by examiner

FIGURE 3A
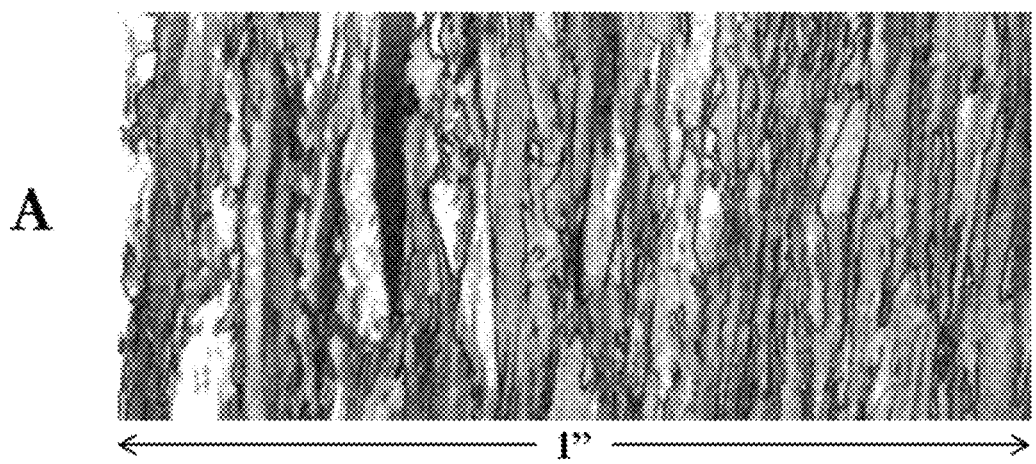
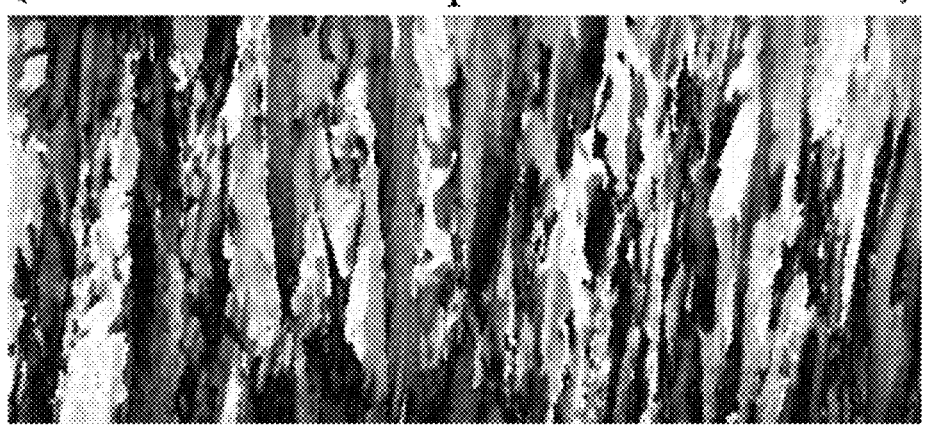
FIGURE 3B

POLARIMETER WITH MULTIPLE INDEPENDENT TUNABLE CHANNELS AND METHOD FOR MATERIAL ORIENTATION IMAGING

CROSS-REFERENCE TO RELATED APPLICATIONS

This application is a continuation-in-part application of U.S. patent application Ser. No. 15/542,064, titled "POLARIMETER WITH MULTIPLE INDEPENDENT TUNABLE CHANNELS AND METHOD FOR MATERIAL AND OBJECT CLASSIFICATION AND RECOGNITION", filed on Jul. 6, 2017, which is a National Stage of International Application No. PCT/US2016/068411 filed Dec. 22, 2016 and the specification and claims thereof are incorporated herein by reference.

STATEMENT REGARDING FEDERALLY SPONSORED RESEARCH OR DEVELOPMENT

This invention was made with government support under Contract No. FA8650-18-C-5023 awarded by the United States Air Force. The United States Government has certain rights in the invention.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND

It is well known that metal-working and metal-forming processes, including casting, forging, and 3D-printing, produce metal-alloy parts with highly crystalline structures and microstructures, and that many physical properties of metal parts are strongly dependent on crystalline structure. Most parts are polycrystalline and characterized by grains with sizes, shapes, and crystal-orientation distributions that vary widely with the alloy and process. Various crystallographic models of physical, electrical, and optical properties of various materials and parts made thereof have been adopted by and become critical to global manufacturing industries. In addition to metals, crystallographic models are critical to manufacturing of optical and laser crystals, ceramics, semiconductor electronics, solar cells, and other crystalline devices and parts.

The strengths and failure probabilities of structural metal parts depend on their crystallographic structure and microstructure. For architectural and aerospace structural metals, application of verified models is mandatory for safety assurance and quality control of safety-critical parts. The diversity of industrial and scientific applications of crystallographic models requires crystallographic measurements to verify and apply the models and implementations. There has therefore traditionally been a need for measurements of crystallographic structure and microstructure, and specifically a demand for crystallographic imaging to reveal crystallographic structure at specific locations on parts.

X-ray diffraction (XRD) was the first technique to regularly measure crystallographic structure over small areas, although diffracted x-rays generally cannot be refocused and recorded to produce crystallographic images. XRD reveals the orientations of crystal planes in the lattice structure and the distances between the atoms that constitute the lattice. Longer-wavelength electromagnetic waves, including visible light, which can obviously form images, do not diffract from crystal planes, but rather exhibit changes in their complex amplitudes upon reflection or transmission that depend on lattice spacing and orientation. Polarized light has therefore been utilized for over 80 years to image and measure the sizes and shapes of crystal grains through techniques commonly referred to as polarized-light microscopy (PLM). While the current invention demonstrates that crystal orientation can be inferred from specific polarized-light measurements made by a partial Mueller-matrix polarimeter, PLM has traditionally been limited to simpler apparati and measurements that do not provide accurate crystal orientation within the imaged grains. Electron beams diffract from crystals similarly to x-rays and can likewise reveal spacings and orientations of crystal planes, and electron beams can be focused to sufficiently small probe spots to enable scanned imaging. The demand for crystallographic orientation imaging, which reveals not only grain sizes and shapes but also crystal orientation within the grains, has motivated more recent development of electron backscattering diffraction (EBSD), a specialized form of scanning electron microscopy (SEM), which has become the preferred technique for crystallographic orientation imaging. While EBSD can provide complete crystallographic structure, including orientation, for most metal alloys, it has significant limitations that affect its practical use. Firstly, EBSD is generally a destructive technique because the part must be cut into a sample small enough to fit into an SEM vacuum chamber. EBSD data-acquisition times are long and, as for any scanning technique, increase linearly with the number of image pixels. EBSD also requires carefully prepared, highly polished surfaces, often necessitating many hours on a vibratory polisher. A significant limitation of EBSD for modeling failure probabilities on industrial metal parts is the limited image size or field-of-view (FOV), which typically does not exceed ten millimeters on a side and, due to the required grazing incident angle, can approach 1 in$^2$ only on highly specialized and expensive electron microscopes. This is a significant limitation because failure probabilities are strongly dependent on spatial correlations of crystal orientations, known as macrozones or microtexture regions (MTR), that often extend over tens of millimeters and larger areas. Collecting crystallographic orientation images of sizes sufficient to verify MTR models is practically infeasible using EBSD. A faster, less destructive, parallel technique for crystallographic orientation imaging is needed to enable application of MTR models to industrial parts.

In conventional PLM the sample is placed between crossed polarizers, forming a cross-polarization channel and image. Polarization-difference imaging (PDI) is similar in utilizing differences between images obtained with the polarizers aligned and crossed. While both conventional PLM and PDI can provide contrast among different grains of anisotropic crystals, they do not provide sufficient dimensionality to enable unique and efficient mapping from polarized reflectivity to crystal orientation. But a more sophisticated instrument, a partial Mueller-matrix polarimeter (pMMP), as described in U.S. Pat. Appln. Pub. No. 2019/0073561 and further by the current invention, can make polarized-reflectivity measurements that can be inverted to reveal the orientations of certain crystals uniquely and efficiently. By modeling or measuring the complete polarization signature or Mueller matrix of the material, as it depends on the crystal orientation, a pMMP can be built and tuned to accomplish orientation imaging of various anisotropic crystals, including non-cubic metals such as beryllium, magnesium, titanium, cobalt, zinc, tin, zirconium, and many of their alloys. The pMMP and method of the current invention can also be applied to anisotropic dielectric crystals, for instance quartz, rutile, gypsum, feldspar, and others, by using the transmission Mueller matrix and transmissivity measurements, although the sample thickness usually must also be known or measured. In uniaxial crystals, including all of the aforementioned non-cubic metals, crystal orientation is quantified by the direction of the crystal c-axis, which is the anisotropic axis of the hexagonally-close-packed (HCP) unit cell in these materials, relative to the sample surface. More specifically and as illustrated in FIG. 2 for titanium, the elevation angle of the c-axis relative to the sample surface is termed the plunge angle, while the azimuthal angle of the c-axis is termed the trend angle. Recent versions of cross-polarization imaging have demonstrated empirical orientation imaging, for instance as described by Böhme et al., *Materials Characterization* 145, 573 (2018), but such techniques require hundreds of images and rely on empirical mappings from cross-polarized reflectivity to orientation. The current invention is superior by employing generalized elliptical polarization states to achieve orientation imaging with far fewer images, and optimally as few as 3-4 images. The embodiment of the current invention based on an electrodynamic signature model utilizes a physical (rather than empirical) mapping from general polarized reflectivity or reflectance to orientation and is therefore more accurate and can accommodate diverse physical effects such as stress, surface roughness, external magnetic fields, and transparent metal oxides formed by thermal processing, which are practically inaccessible to empirical mappings. Orientation images can therefore be obtained for certain cubic metals after heat-tinting, which forms anisotropic oxide layers, or in the presence of external magnetic fields. The pMMP and method of the current invention can also be applied, with alternative descriptions and models, to anisotropic amorphous materials including many polymers, composites, and textiles, and to materials with stress-induced anisotropy such as ice and glasses. Rather than crystal orientation, in these materials the electromagnetic-wave amplitude varies with the orientation of polymer chains, fibers, or applied stress.

BRIEF SUMMARY OF THE INVENTION

One embodiment of the present invention provides for a polarimeter for producing one or more material orientation images of a sample using multiple independent polarization channels comprising a source of controlled electromagnetic radiation that produces a beam that propagates along a path terminating at an imaging detector with the sample positioned there between. A first polarization modulator is positioned in the path preceding the sample and the first polarization modulator is configured to switch serially among multiple independent settings. An electromagnetic-radiation collector is positioned to direct electromagnetic radiation reflected from or transmitted by the sample to a second polarization modulator independent of the first polarization modulator. The second polarization modulator is configured to switch serially among multiple independent settings, wherein the combination of the settings of the first and second polarization modulators defines an independent polarization channel. The imaging detector is positioned to receive electromagnetic radiation from the sample transmitted through the second polarization modulator, wherein the imaging detector comprises pixels and produces a set of images that are spatially registered and synchronized with the channels formed by the first polarization modulator and the second polarization modulator. A processor is connected with a memory, wherein the processor is configured to execute a classification algorithm stored in the memory that maps the set of spatially registered images to one or more material orientation images by mapping a set of values for each detector pixel corresponding to the set of spatially registered images to a value of material orientation at each pixel coordinate using a model.

Another aspect of the present invention provides for a method of analyzing material orientation of a sample using a polarimeter as described herein having multiple independent polarization channels comprising the steps of producing a beam with a source of controlled electromagnetic radiation that produces a beam that propagates along a path terminating at an imaging detector with the sample positioned there between. A first polarization modulator configured to switch serially among multiple independent settings is positioned in the path preceding the sample. An electromagnetic-radiation collector is positioned to direct a portion of electromagnetic radiation reflected from or transmitted by the sample to a second polarization modulator independent of the first polarization modulator wherein the second polarization modulator is configured to switch serially among multiple independent settings, wherein the combination of the settings of the first and second polarization modulators defines an independent polarization channel. The imaging detector is positioned to receive the electromagnetic radiation from the second polarization modulator, wherein the detector comprises pixels and produces a set of images that are spatially registered and synchronized with the channels formed by the first polarization modulator and the second polarization modulator. A processor connected with a memory is connected to the polarimeter, wherein the processor is configured to execute a classification algorithm stored in the memory that maps the set of spatially registered images to one or more material orientation images by mapping a set of values for each detector pixel corresponding to the set of spatially registered images to a value of material orientation at each pixel coordinate using a model.

Another aspect of one embodiment of the present invention provides for a method of producing material orientation images of a sample comprising collecting a set of three or more polarized images using a partial Mueller-matrix polarimeter tuned to three or more corresponding channels and combining the polarized images to form orientation feature images that correspond to material orientation as described by a model.

In one embodiment, the multiple independent polarization channels comprises at least three independent polarization channels for example, between three and ten independent polarization channels. In another embodiment, there are no more than 100, 80, 70, 50, 30, 10, 5 or 4 independent polarization channels. In another embodiment, the setting of the first polarization modulator and the setting of the second polarization modulator are tunable. In one embodiment, the model is a machine-learning algorithm trained on a database of Mueller matrices of samples with known material orientations, and in another embodiment the model is an electrodynamic model. In one embodiment, the sample is comprised of crystals and the orientation images are crystallographic-orientation images, for example, the crystals are uniaxial crystals and the crystallographic-orientation images are c-axis images or for example, the crystals are isotropic cubic crystals previously subjected to heat-tinting to produce anisotropic metal oxides. In one embodiment, the sample is metallic and may be subjected to an external magnetic field. In another embodiment, the sample is a diffuse reflector. In one example, the sample is curved or otherwise not flat, in another example, the sample is reflective and the polarimeter is arranged in a bistatic geometry with an arbitrary bistatic angle or further, the sample is reflective and the polarimeter is arranged in a monostatic geometry utilizing a beam-splitter. In one embodiment, the polarimeter is packaged as a module that can be inserted into a conventional microscope and or further, the polarimeter, excluding the sample assembly, is mounted on a tripod or other transportable platform.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 3A-B is an illustration of grayscale crystal-orientation images of a titanium-alloy sample produced by an embodiment of the current invention; (A): c-axis plunge angle ($\theta$) image in which $\theta=0°$ is black and $\theta=90°$ is white, and (B) c-axis trend angle ($\phi$) image.

DETAILED DESCRIPTION OF THE INVENTION

Figure 1:
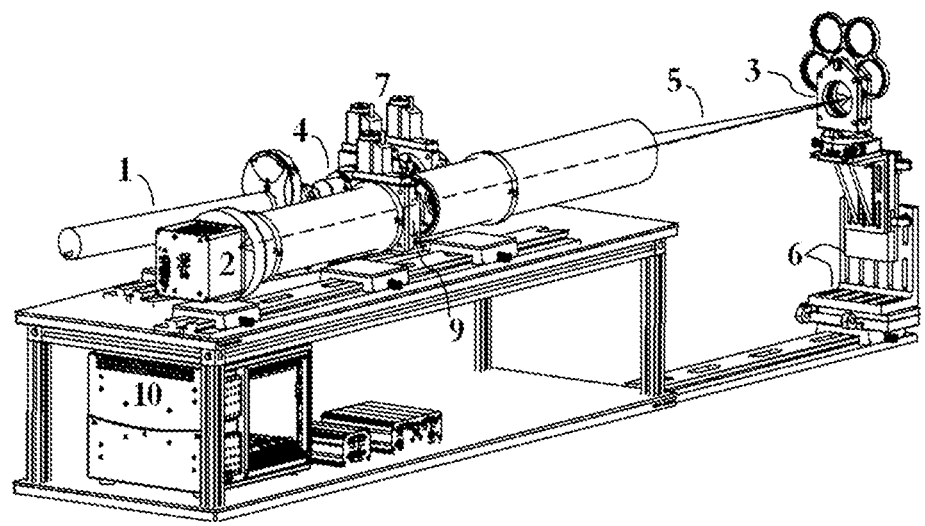
FIG. 1A-B is an illustration of an embodiment of the partial Mueller-matrix polarimeter (pMMP) of the current invention, featuring polarization modulators comprised of polarization crystals mounted in motorized rotary stages, in reflection (A) and transmission (B) configurations.

The partial Mueller-matrix polarimeter (pMMP) of the current invention was introduced in U.S. Pat. Appln. Pub. No. 2019/0073561 and is further described with reference to FIG. 1. The pMMP used to perform material orientation imaging comprises a source of controlled electromagnetic radiation (EMR), preferably a laser (1), positioned in a path with an imaging detector (2) and a sample (3) positioned there between. The pMMP further comprises expansion and collimation optics (4) to produce an expanded and approximately collimated beam (5) that illuminates the sample. The illumination beam can be between 1-2 inches in diameter or larger to realize a large instantaneous FOV, and even larger images can be achieved by translating samples under the illumination beam, employing translation stages (6) on the sample assembly and stitching the resulting orientation images together using standard digital image-processing routines. For reflective samples the pMMP may assume a monostatic geometry, utilizing a beamsplitter similar to a conventional microscope, or a bistatic geometry with an arbitrary bistatic angle.

FIG. 1 illustrates an embodiment with a small bistatic angle, but the bistatic angle can also be larger, in which case the pMMP resembles a conventional ellipsometer. If a reflective sample is highly polished, or metallographically polished, such that it reflects like a mirror, then the incident angle on the sample is half the bistatic angle, although the current invention can also be applied to rougher samples that reflect diffusely, in which case the incident angle can be variable in relation to the bistatic angle. Diffuse reflective samples include but are not limited to 3D-printed samples and any samples not subject to conventional polishing or fabrication by deposition to produce a mirror-like finish. Application to diffuse reflective samples also allows the polarimeter of the current invention to map crystal orientation on diffusely-reflecting curved samples and surfaces. For applications to 3D-printed samples the polarimeter and method can be configured to provide material orientation images of each layer or of selected layers produced during the printing process.

Regardless of its geometry, the pMMP comprises a first set of independent polarization modulators (7) configured to serially modulate the polarization state of the probe beam among a set of independent polarization states. The pMMP further comprises an EMR collector not shown) and a second polarization modulator (9) independent of the first set of polarization modulators. The EMR collector is large enough to enable imaging resolution adequate to resolve grains of sizes that commonly occur in industrial parts, for instance down to 10 microns or somewhat smaller. The combined settings of the first set of polarization modulators and the second polarization modulator are temporally-multiplexed and define multiple independent tunable polarization channels. The EMR detector (2), preferably an imaging detector such as a CCD or CMOS focal-plane array (FPA), is positioned to receive the EMR from the second polarization modulator, wherein the detector comprises pixels and produces a set of images that are synchronized with the set of channels formed by the first set of polarization modulators and the second polarization modulator. The pMMP further comprises a processor connected with a memory (10), wherein the processor is configured to execute a classification algorithm stored in the memory that provides an estimate of material orientation. In an imaging pMMP the material orientation is estimated at each image pixel and therefore at each coordinate on the sample.

In a first embodiment, which was introduced in U.S. Pat. Appln. Pub. No. 2019/0073561 and can achieve high-speed material orientation imaging, the first set of polarization modulators is located on a set of independent arms and the beam is directed serially among the first set of modulators by a first scanning element. The beam is then redirected, by reflection from an assembly of mirrors located on each independent arm, to a second scanning element that redirects the beam from each independent arm to a common path pointed at the sample. In this embodiment each member of the first set of independent polarization modulators, in combination with the second polarization modulator, defines an independent polarization channel. U.S. Pat. Appln. Pub. No. 2019/0073561 depicts one example of this embodiment.

In a second embodiment, which is illustrated in FIG. 1 and can achieve material orientation imaging using a polarimeter with lower size, weight, and power (SWaP) requirements, which can for instance be mounted on a tripod or other transportable platform, the members of the first set of polarization modulators are located in series on a common arm and are configured to switch serially among two or more independent settings, thereby modulating the polarization state of the beam among a set of independent polarization states. The second polarization modulator is likewise configured to switch serially among two or more independent settings. In this embodiment each setting of the first set of independent modulators, in combination with the setting of the second modulator, defines an independent polarization channel. The modulators can be one of several established devices, for UV, visible, or IR light for instance single polarization crystals or waveplates mounted in manual or preferably motorized rotary stages, which is the embodiment illustrated in FIG. 1, or two or more non-rotating polarization crystals mounted on a wheel or on a sliding linear stage.

Like a conventional optical microscope, the imaging pMMP of the current invention performs parallel imaging based on established optical designs utilizing commercial lenses and mirrors, although most of the lenses and mirrors of a pMMP must be either polarization-preserving or pre-calibrated in order to eliminate systematic measurement errors. According to the current invention a suitable conventional microscope can be converted into a pMMP suitable for material orientation imaging by adding a module or modules containing the first set of polarization modulators and the second polarization modulator, software for controlling the modulators, and software to implement classification or orientation mapping. The images collected in different polarization channels can be recorded, for instance by a digital FPA, and the set of polarized irradiances at each image pixel can be mapped to a material orientation. The light source must be highly polarized, but can be either coherent or diffuse; a polarization-preserving diffuser can be added to eliminate coherent artifacts.

The pMMP measurements are related to the polarization signature or Mueller matrix of the material, and the material dependence of the Mueller matrix can be modeled by several approaches, for instance using a machine-learning classifier trained on Mueller-matrix measurements of samples with known material orientations, or by using an electrodynamic model.

For material orientation imaging polarized images are collected in a set of 3 or more channels from which the recorded image irradiances are functionals of the polarization signature or Mueller matrix of the material at the prevailing optical frequency, incident angle, reflection or transmission angle, and sample finish or condition, among other parameters that can affect the signature. Channel images may be combined in compositions, for instance sums or differences of images or normalized images, in which the resulting image irradiances represent features of the sample that correspond to physical characteristics as determined by a model. Features include but are not limited to individual Mueller-matrix elements. Specific to crystallographic orientation imaging, orientation features correspond to local crystal orientation uniquely over a particular range of orientation, so that a measured orientation feature can be mapped to a unique crystal orientation. For example, mapping the c-axis of a uniaxial crystal can be defined mathematically by the two equations $$F_\Phi(\overleftrightarrow{M}) = t(\phi)$$

and $$F_\Theta(\overleftrightarrow{M}) = p(\theta),$$

where $F_\Phi$ is the trend feature, $\overleftrightarrow{M}$ is the Mueller matrix, t is the trend mapping function, and $\phi$ is the trend angle, while $F_\Theta$ is the plunge feature, p is the plunge mapping function, and $\theta$ is the plunge angle. The mapping functions t and p must be invertible over the relevant ranges of $\phi$ and $\theta$ respectively. For pMMP applications including material orientation imaging the features F depend on only a subset of the Mueller matrix $\overleftrightarrow{M}$; a pMMP therefore measures only a subset of the Mueller matrix. In general, the pMMP of the current invention measures more diverse polarization states than a conventional PLM or PDI sensor but less than a complete Mueller-matrix polarimeter like those described in U.S. Pat. Nos. 4,306,809, 5,247,176, and 5,956,147, or in Hoover et al., Optics Express 24(17), 19881 (2016).

Figure 2:
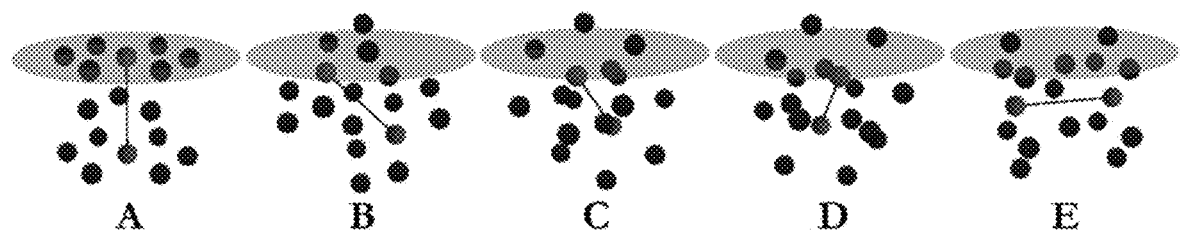
FIG. 2 is an illustration of a hexagonally close-packed (HCP) crystal unit cell in various orientations relative to the sample surface, which is depicted as a gray disk; the crystal c-axis is indicated by a solid line and illustrated in the orientations A: $(\phi,\theta)=(0°,0°)$, B: $(\phi,\theta)=) (0,45°)$, C: $(\phi,\theta)=(45°,45°)$, D: $(\phi,\theta)=(90°,45°)$, and E: $(\phi,\theta)=(180°,90°)$.
Figure 4:
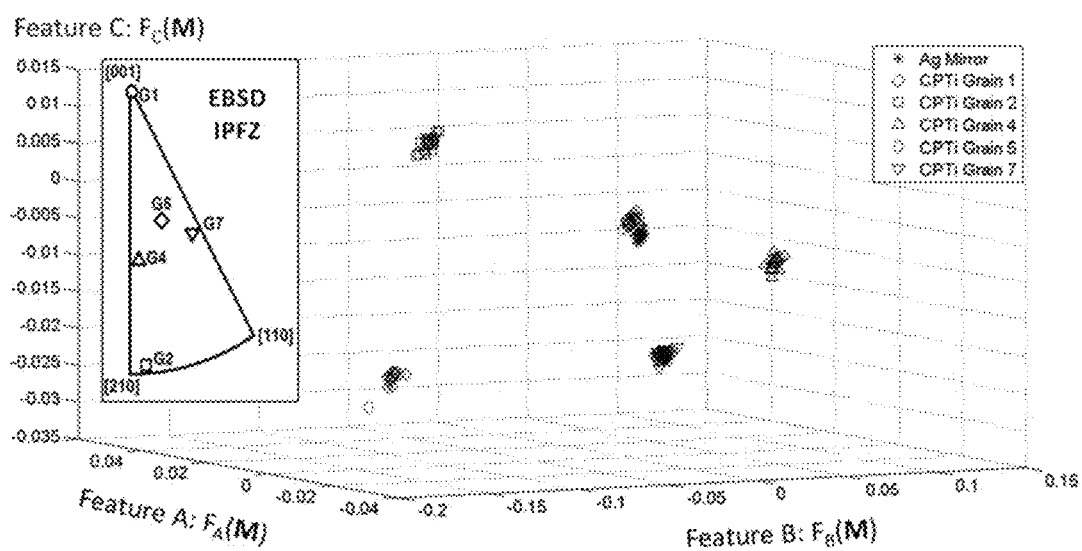
FIG. 4 is a cluster diagram that illustrates mapping from crystal orientation, for the case of a commercially-pure titanium sample, to selected polarized-reflectivity features specified by a pattern-recognition algorithm, wherein the orientations of the titanium crystals are indicated by an EBSD inverse pole figure and the reflectivity of a silver mirror is included for reference.

In image format the measurements and mappings are obtained and applied to each image pixel, usually independently, although multi-pixel mappings are also possible. For crystallographic orientation imaging the orientation features can be deduced by measuring a sufficient number of crystals with known orientations and projecting, using established machine-learning and pattern-recognition algorithms, the resulting measured features into a subspace wherein each orientation maps to a unique volume. This training approach is illustrated in FIG. 4. The orientation features can also be defined by feature dependence on crystal orientation according to a physical model, for instance an electrodynamic model. For c-axis mapping there can be separate orientation features for the crystal plunge and trend angles. There can also be separate orientation features for different orientation ranges, for instance an orientation feature appropriate for plunge angles near 0° (see FIG. 2) and a different orientation feature appropriate for plunge angles near 90°, and one or more other orientation features for intermediate ranges. Whether using machine-learning or a physical model, the classifier must be trained on signature measurements of crystals with known orientations, with the orientations obtainable from EBSD or XRD measurements. The signature measurements for training are often made on a polarimeter that measures the complete Mueller matrix, such as those instruments described in U.S. Pat. Nos. 4,306,809, 5,247,176, and 5,956,147, or in Hoover et al., Optics Express 24(17), 19881 (2016). If the grains on which the classifier is to be trained are sufficiently large, then the training measurements can be made with a spot-probe polarimeter, in which the laser probe is focused to a small spot on the training samples, rather than an imaging polarimeter with an expanded beam. Once the classifier is trained for a particular material, alloy, or sample type, then for subsequent samples of the same type the classifier can be run and orientation images obtained with the pMMP of the current invention without the need for signature measurements and a training process, therefore without the need for EBSD or XRD measurements. The classifier estimates of crystal orientation at each image pixel can be depicted in grayscale images, for instance as demonstrated in FIG. 3, or in a single color image wherein the orientation angles, for instance the c-axis plunge and trend angles, are color-coded according to a preferred colormap. Color images are advantageous for representing the entire crystal orientation in a single image and for representing periodic orientation angles with smooth color transitions. The overall orientation angle can alternatively be represented by a glyph or oriented icon assigned to each grain in the image. Crystallographic orientation images, or their analogs for amorphous materials, can also be provided as digital image files that provide orientation angles for each pixel. Such digital image files are useful for material, crystallographic, and texture analysis using a diversity of models.

In at least one embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of producing one or more material orientation images of a sample using a polarimeter having multiple independent polarization channels comprising the steps of:
producing a beam from a source of controlled electromagnetic radiation that propagates along a path terminating at an imaging detector with the sample positioned there between;
positioning a first polarization modulator configured to switch serially among multiple independent settings in the path preceding the sample;
positioning a second polarization modulator in the path following the sample wherein the second polarization modulator is independent of the first polarization modulator and the second polarization modulator is configured to switch serially among the multiple independent settings, wherein a combination of the settings of the first and second polarization modulators defines an independent polarization channel and wherein the multiple independent polarization channels are tuned to measure a partial Mueller matrix of the sample that is specified according to a priori Mueller matrices known from a model or measurement corresponding to the sample or a sample type;
positioning the imaging detector to receive the electromagnetic radiation from the second polarization modulator, wherein the imaging detector comprises one or more pixels and collects a set of no more than ten polarization images corresponding to no more than ten independent polarization channels;
executing a processor connected with a memory, wherein the processor is configured to execute a classification algorithm stored in the memory that maps the set of polarization images to one or more material orientation images by combining the collected set of polarization images to form orientation feature images that correspond to the one or more material orientation images as described by the model; and
applying an invertible mapping function as determined by the model between the orientation feature images and one or more orientation parameters of the sample,
wherein the sample is comprised of crystals and wherein the model is an electrodynamic model that determines the invertible mapping function between the orientation feature images and one or more of i) a trend angle of the crystal c-axis and ii) a plunge angle of the crystal c-axis.

2. The method of claim 1 wherein the no more than ten independent polarization channels comprise at least 3 independent polarization channels.

3. The method of claim 1 wherein the setting of the first polarization modulator and the setting of the second polarization modulator are tunable.

4. The method of claim 1 wherein the invertible mapping function comprises projecting into a subspace wherein each of an orientation value maps to a unique volume.

5. The method of claim 1 wherein the crystals are uniaxial crystals.

6. The method of claim 1 wherein the sample is metallic.

7. The method of claim 1 wherein the sample is subjected to an external magnetic field.

8. The method of claim 1 wherein the sample is a diffuse reflector.

9. The method of claim 8 wherein the sample is curved or otherwise not flat.

10. The method of claim 1 wherein the sample is reflective.

11. The method of claim 1 wherein the polarimeter is packaged as a module that can be inserted into a conventional microscope.

12. The method of claim 1 wherein the polarimeter, excluding the sample assembly, is mounted on a tripod or other transportable platform.

13. The method of claim 1 wherein no more than ten polarization images is between 4-10 polarization images and wherein no more than ten corresponding channels is between 4-10 corresponding channels.

14. The method of claim 1 wherein the one or more material orientation images are derived from separate orientation features corresponding to different orientation ranges.

15. The method of claim 1 wherein the sample is highly polished or metallographically polished.

16. The method of claim 1 wherein the imaging detector comprises a single pixel.

* * * * *